United States Patent [19]
Strack et al.

[11] Patent Number: 6,147,496
[45] Date of Patent: Nov. 14, 2000

[54] DETERMINING ELECTRICAL CONDUCTIVITY OF A LAMINATED EARTH FORMATION USING INDUCTION LOGGING

[75] Inventors: Kurt-Martin Strack; Leonty Abraham Tabarovsky; David Ronald Bear, all of Houston, Tex.; Melis van der Horst, Rijswijk, Netherlands

[73] Assignee: Shell Oil Company, Houston, Tex.

[21] Appl. No.: 08/886,725

[22] Filed: Jul. 1, 1997

Related U.S. Application Data

[60] Provisional application No. 60/020,964, Jul. 1, 1996.
[51] Int. Cl.$^7$ .............................. G01V 3/10; G01V 3/18; G01V 3/28; G06F 19/00
[52] U.S. Cl. ............................................... 324/343; 702/7
[58] Field of Search .................................. 324/343, 339, 324/346; 702/6, 7

[56] References Cited

U.S. PATENT DOCUMENTS

| | | | |
|---|---|---|---|
| 3,808,520 | 4/1974 | Runge | 324/343 |
| 4,972,150 | 11/1990 | Tabbagh | 324/343 |
| 5,781,436 | 7/1998 | Forgang et al. | 324/343 |

Primary Examiner—Walter E. Snow

[57] ABSTRACT

A method is provided for determining an electric conductivity of an earth formation formed of different earth layers, which earth formation is penetrated by a wellbore containing a wellbore fluid, is provided. The method includes the steps of: lowering an induction logging tool into the wellbore to a location surrounded by a selected one of the earth layers, the tool having a magnetic field transmitter effective to induce magnetic fields of different frequencies in the earth formation, and a magnetic field receiver effective to receive response magnetic fields and to provide a signal representative of each response magnetic field, at least one of the transmitter and the receiver having a plurality of magnetic dipole moments in mutually orthogonal directions. At least two of the different frequencies are selected, and for each selected frequency, the transmitter is operated so as to induce a magnetic field in the earth formation and the receiver is operated so as to provide a signal representing a response magnetic field, wherein the at least one of the transmitter and receiver is operated in the mutually orthogonal directions. The signals are combined in a manner so as to create a combined signal having a reduced dependency on the electric conductivity in the wellbore region. The formation resistivity and the relative orientation of the logging tool with respect to the formation layering is determined from the combined signal.

5 Claims, 2 Drawing Sheets

DETERMINING ELECTRICAL CONDUCTIVITY OF A LAMINATED EARTH FORMATION USING INDUCTION LOGGING

RELATED APPLICATIONS

This application claims priority to U.S. Provisional Pat. application No. 60/020,964, filed on Jul. 1, 1996.

FIELD OF THE INVENTION

The present invention relates to a method of determining electric conductivity of an earth formation formed of different earth layers, whereby a wellbore containing a wellbore fluid extends into the earth formation.

BACKGROUND TO THE INVENTION

In general, hydrocarbon-bearing zones are difficult to detect in laminated clastic reservoirs consisting of alternating thin layers of shale and sand, when using a conventional induction logging tool. If the layers are too thin to be detected individually by the induction logging tool because the vertical resolution of the tool is too low, the tool reads an average conductivity of the formation. In a vertical borehole, a conventional induction logging tool with the magnetic dipole moments in vertical direction reads an average conductivity which is a combination of the sand- and shale conductivities, but which is dominated by the relatively high conductivity of shale layers. A transversal induction logging tool with the magnetic dipole moments in horizontal direction reads an average conductivity which is dominated by the relatively low conductivity of the hydrocarbon-bearing sand layers.

If the volume of shale/sand in the formation is known, e.g. from measurements using a gamma-ray tool or a nuclear tool, a combination of a conventional induction logging tool and transversal induction logging tool can be used to determine the conductivities of the individual shale- and sand-layers, provided the layers of the same type have the same conductivity. However, the response of the transversal induction logging tool is difficult to interpret because its response suffers from large borehole-effects and wellbore fluid invasion-effects.

A known method of reducing the borehole-effects from the response of transversal induction logging tool is disclosed in Tabarovskii et al, 1979, "Radial characteristics of induction focusing probes with transverse detectors in an anisotropic medium", Soviet Geology and Geophysics, 20, pp. 81–90. In this method an induction logging tool is used, which tool comprises magnetic field transmitter means suitable to induce a magnetic field in the formation, and magnetic field receiver means suitable to receive response magnetic fields at different spacings from the transmitter means and to provide a signal representative of each response magnetic field. However, the logs obtained when using this tool are rather "wild" and are therefore difficult to interpret. This problem becomes even more manifest when the tool is run through a sequence of earth layers.

It is therefore an object of the invention to provide a method of determining a characteristic of an earth layer of a laminated earth formation, in which a log response is obtained which is easy to interpret and which provides an accurate indication of the characteristic even if the thickness of the individual earth layers is relatively thin. Furthermore, it is desirable that the relative orientation of the logging tool with respect to the formation layering is determined.

It is a further object of the invention to provide a system for carrying out the method according to the invention.

It is another object of the invention to provide an induction logging tool for use in the method and system according to the invention.

SUMMARY OF THE INVENTION

In accordance with the invention there is provided a method of determining an electric conductivity of an earth formation formed of different earth layers, which earth formation is penetrated by a wellbore containing a wellbore fluid, the method comprising the steps of:

lowering an induction logging tool into the wellbore to a location surrounded by a selected one of the earth layers, the tool comprising a magnetic field transmitter effective to induce magnetic fields of different frequencies in the earth formation, and a magnetic field receiver effective to receive response magnetic fields and for providing a signal representative of each response magnetic field, at least one of the transmitter and the receiver having a plurality of magnetic dipole moments in mutually orthogonal directions;

selecting at least two of the different frequencies;

for each selected frequency, operating the transmitter so as to induce a magnetic field in the earth formation;

operating the receiver so as to provide a signal representing a response magnetic field, wherein the at least one of the transmitter and receiver is operated in the mutually orthogonal directions;

combining the signals in a manner so as to create a combined signal having a reduced dependency on the electric conductivity in the wellbore region; and determining from the combined signal the formation resistivity and the relative orientation of the logging tool with respect to the formation layering.

The signals can be written as a series expansion in the frequency, which series expansion contains a term linear in the frequency which is mainly determined by the conductivity in the wellbore region. By combining the equations describing the series expansion of the signals in such a manner that the term linear in the frequency is eliminated, a new set of equations is obtained from which the influence of the wellbore region is virtually eliminated. Further, by operating in different mutually orthogonal directions the orientation of the tool with respect to the formation layering can be taken into account.

To reduce an influence of adjacent layers, preferably the receiver means is suitable to receive response magnetic fields at different spacings from the transmitter means, at least two of said different spacings being selected, the transmitter means and the receiver means being operated for different combinations of the selected frequencies and the selected spacings, and the signals are further combined in a manner so that said combined signal has a reduced dependency on the electric conductivity of an earth layer adjacent the selected earth layer.

The series expansion contains a term which is non-linear in the frequency and which is mainly determined by the conductivity of the adjacent layer(s). By combining the equations so that from each equation the dominant term which is non-linear in the frequency is eliminated, a resulting equation is obtained from which the influence of the wellbore region and the adjacent layer(s) is virtually eliminated. It was found that the signals at the receiver means only weakly depend on the spacing between the transmitter means and the receiver means, which spacing is hereinafter referred to as the tool-spacing. The series expansions of the signals are therefore also not significantly dependent on the tool-spacing.

Preferably, each of the transmitter means and the receiver means has a plurality of magnetic dipole moments in mutually orthogonal directions, and wherein each of the transmitter and receiver means is operated in said mutually orthogonal directions.

Suitably, each of the transmitter means and the receiver means has three magnetic dipole moments in three orthogonal directions, and wherein each of the transmitter and receiver means is operated in said three mutually orthogonal directions.

DESCRIPTION OF A PREFERRED EMBODIMENT

Figure 1:
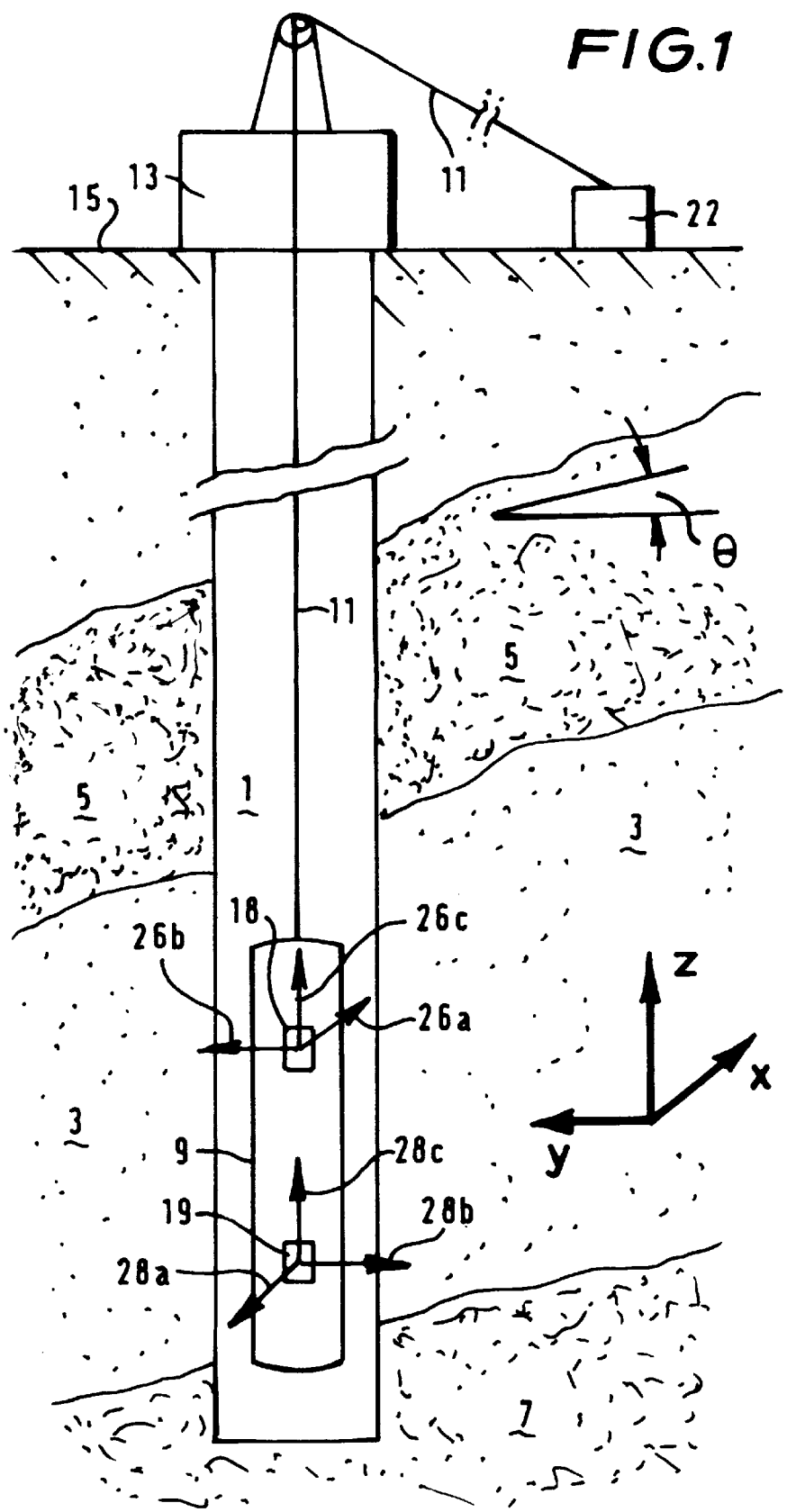
FIG. 1 shows schematically a wellbore extending into a laminated earth formation, into which wellbore an induction logging tool as used in the method according to the invention has been lowered.

The wellbore 1 in FIG. 1 extends into an earth formation which includes a hydrocarbon-bearing sand layer 3 located between an upper shale layer 5 and a lower shale layer 7, the shale layers 5, 7 having a higher conductivity than the hydrocarbon bearing sand layer 3. An induction logging tool 9 used in the practice of the invention has been lowered into the wellbore 1 via a wireline 11 extending through a blowout preventor 13 (shown schematically) located at the earth surface 15. The relative orientation of the wellbore 1 and the logging tool 9 with respect to the layers 3, 5, 7 is determined by two angles, one of which ($\theta$) is shown in the Figure. The logging tool 9 is provided with a set of transmitter coils 18 and a set of receiver coils 19, each set of coils 18, 19 being connected to surface equipment 22 via suitable conductors (not shown) extending along the wireline 11. The surface equipment 22 includes an electric power supply to provide electric power to the set of coils 18 and a signal processor to receive and process electric signals from the receiver coils 19.

Each set of coils 18, 19 includes three coils (not shown) which are arranged such that the set has three magnetic dipole moments in mutually orthogonal directions, i.e. in x, y and z directions. Thus, set of coils 18 has magnetic dipole moments 26a, 26b, 26c, and set of coils 19 has magnetic dipole moments 28a, 28b, 28c. The coils with magnetic dipole moments 26a and 28a are transverse coils, i.e. they are oriented so as to have magnetic dipole moments perpendicular to the wellbore axis, whereby the direction of magnetic dipole moment 28a is opposite to the direction of magnetic dipole moment 26a. Furthermore the set of coils 18, 19 are positioned substantially along the longitudinal axis of the logging tool 9.

For ease of reference, normal operation of the tool 9 will be described hereinafter only for the coils having dipole moments in the x-direction, i.e. dipole moments 26a, 28a.

During normal operation an alternating current of a frequency $f_1$ is supplied by the electric power supply of surface equipment 22 to transmitter coil set 18 so that a magnetic field with magnetic dipole moment 26a is induced in the formation. This magnetic field extends into the sand layer 3 and thereby induces a current in the sand layer 3, which current is composed of a number of local eddy currents. The magnitude of such local eddy current is dependent on its location relative to the transmitter coil set 18, the conductivity of the earth formation at said location, and the frequency at which the transmitter coil set 18 operates. In principle the local eddy currents act as a source inducing new currents which again induce further new currents, etc. The current induced in sand layer 3 induces a response magnetic field, which is out of phase with the induced magnetic field, and which induces a response current in receiver coil set 19. Since the magnitude of the current induced in the sand layer 3 depends on the conductivity of the sand layer 3, the magnitude of the response current in receiver coil set 19 also depends on this conductivity and thereby provides an indication of the conductivity of the sand layer 3. However, the magnetic field generated by transmitter coil set 18 not only extends into sand layer 3, but also in the wellbore fluid and in the shale layers 5, 7 so that currents in the wellbore fluid and the shale layers 5, 7 are induced, which lead to additional components in the response current in the receiver coil set 19. These additional components can be linearly dependent on the frequency at which the transmitter coil set 18 operates, or can be proportional to higher orders terms in the frequency. In general the higher order terms become dominant if the volume of the wellbore 1 is relatively large, and/or if the frequency or the conductivity is relatively large. If this is not the case, the dominant contribution of the wellbore fluid to the total response at the receiver coil set 19 forms the component linear in the frequency.

The response magnetic field $h(f_1)$ which is received by the receiver coil set 19 can be written as a series expansion in the frequency:

$$h(f_1)=f_1 h_1+f_1^{3/2} h_2+f_1^2 h_3+ \tag{1}$$

wherein $h_1$, $h_2$, $h_3$ are series expansion terms of the response magnetic field $h(f)$.

The component $f_1 h_1$ is substantially dependent on the conductivity in the wellbore region, i.e. this term depends mainly on the conductivity of the wellbore fluid.

Next an alternating current of a frequency $f_2$ is supplied by the electric power supply of surface equipment 22 to transmitter coil set 18 so that a magnetic field of frequency $f_2$ is induced in the formation, the frequency $f_2$ being selected suitably different from $f_1$. Similarly to the magnetic field of frequency $f_1$, the magnetic field of frequency $f_2$ induces a current in the layers 3, 5, 7, which current induces a response magnetic field in the formation, the response magnetic field inducing a response current in receiver coil set 19. The response magnetic field received by receiver coil set 19 can be written as a series expansion in the frequency:

$$h(f_2)=f_2 h_1+f_2^{3/2} h_2+f_2^2 h_3+ \tag{2}$$

The component $f_2 h_1$ in expression (2) is mainly dependent on the conductivity in the wellbore region.

By combining equations (1) and (2) in a suitable manner the components $f_1 h_1$ and $f_2 h_1$ can be eliminated, the resulting expression being:

$$h(f_1,f_2)=h(f_1)-(f_1/f_2)h(f_2) \tag{3}$$

In this way the terms linear in the frequency are eliminated, and thereby the influence of the wellbore region in the expression (3) is substantially eliminated.

To take into account and to determine the relative orientation of the logging tool with respect to the formation layering, the procedure described above is repeated for the coils having magnetic dipole directions in the y-, and z-directions respectively. For example, when coil set 18 is operable to produce the magnetic field with magnetic dipole moment 24a, the response magnetic field is measured with coil set 19 along magnetic dipole moments 28b and 28c respectively. Similarly, when coil set 18 is operated to produce a magnetic field with magnetic dipole moment 26b or 26c, the response magnetic field is also measured with coil set 19 along magnetic dipole moments 28a, 28b and 28c respectively, etc. In this manner a plurality of sets of equations (1)–(4) is arrived at from which the relative orientation can be determined.

Figure 2:
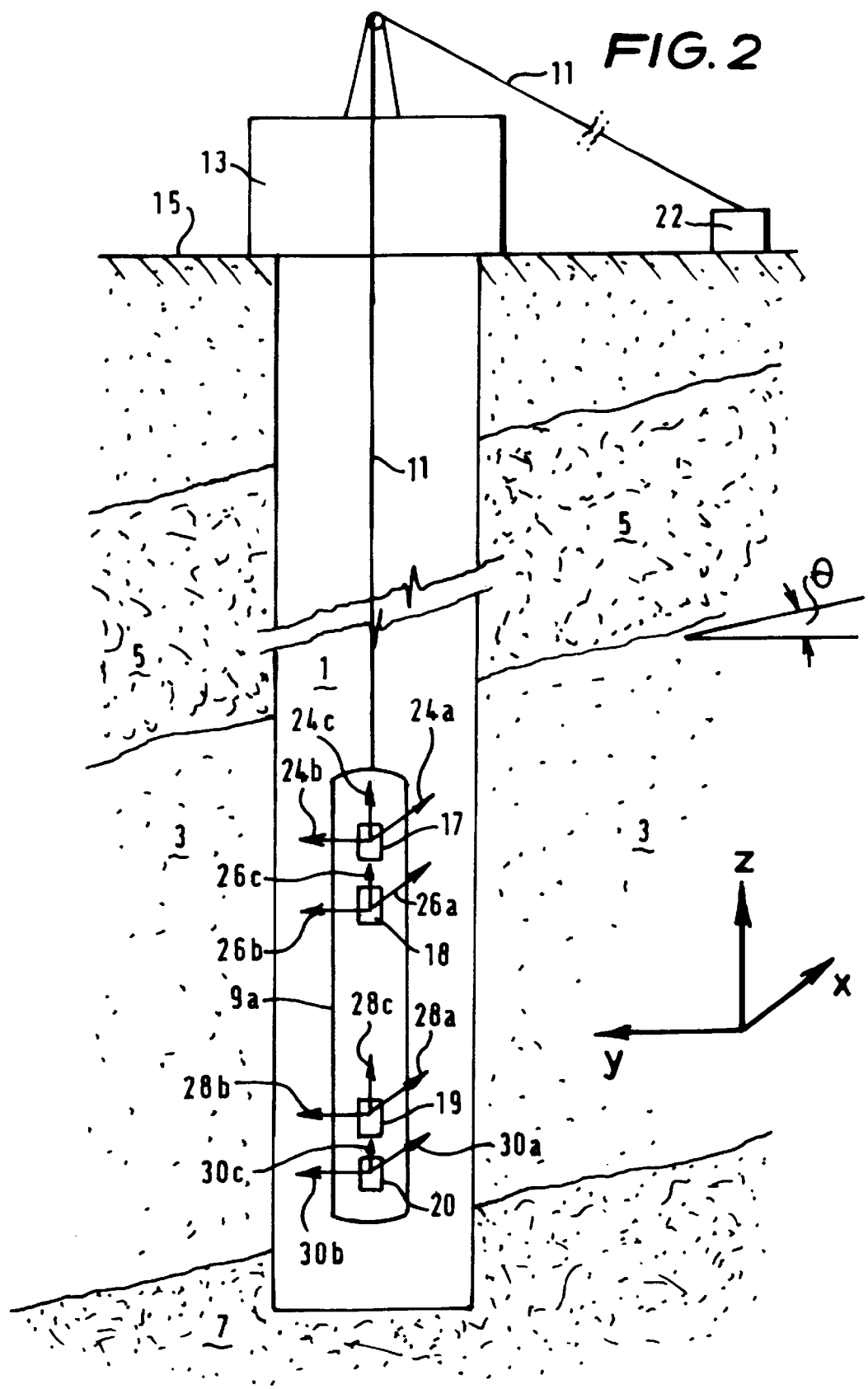
FIG. 2 shows the wellbore of FIG. 1, into which wellbore an alternative induction logging tool as used in the method according to the invention has been lowered.

FIG. 2 shows schematically the same wellbore as shown in FIG. 1, into which wellbore an alternative induction logging tool as used in the method according to the invention has been lowered. The alternative logging tool 9a is provided with two sets of transmitter coils 17, 18 and two sets of receiver coils 19, 20, each set of coils 17, 18, 19, 20 being connected to the surface equipment 22 via suitable conductors (not shown) extending along the wireline 11.

Similarly to the tool of FIG. 1, each set of coils 17, 18, 19, 20 includes three coils (not shown) which are arranged such that the set has three magnetic dipole moments in mutually orthogonal directions, i.e. in x, y and z directions. Thus set of coils 17 has magnetic dipole moments 24a, 24b, 24c, set of coils 18 has magnetic dipole moments 26a, 26b, 26c, set of coils 19 has magnetic dipole moments 28a, 28b, 28c, and set of coils 20 has magnetic dipole moments 30a, 30b, 30c. The pair of sets of coils 17, 20 and the pair of sets of coils 18, 19 have a common mid-point which is defined as the point located halfway the distance between the sets of coils of such pair. The spacing between the sets of coils of such pair is hereinafter referred to as the tool-spacing. The tool-spacing of the pair of sets of coils 17, 20 is $L_1$, and the tool-spacing of the pair of sets of coils 18, 19 is $L_2$, whereby $L_2 > L_2$.

Normal operation of the tool 9a is largely similar to normal operation of the tool 9 of FIG. 1, except for the following additional steps. After having eliminated the terms linear in the frequency as described with reference to FIG. 1, the present invention uses the further insight that the terms proportional to $f^{3/2}$ are virtually independent of the tool-spacing, and that the vertical resolution of the frequency focused response can be improved by combining the separate responses of two frequency focused transmitter/receiver pairs with different tool-spacings. In this way the terms proportional to $f^{3/2}$ can be cancelled. If the applied frequencies are selected to be equal for both transmitter/receiver pairs, this cancellation can suitably be achieved by using the same magnetic dipole moments for the transmitter coil sets 17, 18, but opposite magnetic dipole moments for the receiver coil sets 19, 20. Alternatively, different frequency pairs can be used for the transmitter/receiver pairs.

Accordingly, in a next step transmitter coil set 17 is used to induce a magnetic field and corresponding current field in the formation, and receiver coil set 20 is used to provide a signal indicative of the response magnetic field. The alternating current supplied to transmitter coil set 17 is of frequency $f_1$, i.e. the same current frequency as previously supplied to transmitter coil set 18. The response magnetic field h' can be written in a series expansion similar to expression (1), which series expansion contains a component $f_1 h'_1$ which is mainly dependent on the conductivity in the wellbore region, and a component $f_1^{3/2} h'_2$ which is mainly dependent on the conductivity of the shale layers 5, 7. Next an alternating current of frequency $f_2$ is supplied to transmitter coil set 17 is, i.e. the same current frequency as previously supplied to transmitter coil set 18. The response magnetic field h' can be written in a series expansion similar to expression (2), which series expansion contains a component $f_2 h'_1$ which is mainly dependent on the conductivity in the wellbore region, and a component $f_2^{3/2} h'_2$ which is mainly dependent on the conductivity of the shale layers 5, 7. By combining these series expansions in a manner similarly as described with reference to expressions (1) and (2), the terms linear in the frequency can be eliminated, thereby arriving at a resulting expression:

$$h'(f_1, f_2) = h'(f_1) - (f_1/f_2) h'(f_2) \tag{4}$$

By combining expressions (3) and (4), the components with terms $f_1^{3/2}$ and $f_2^{3/2}$ can now be eliminated so that a resulting expression is obtained from which the influence of the conductivity in the wellbore region and the conductivity of the shale layers 5, 7 are virtually eliminated. This resulting expression is provided in the form of a combined signal by the surface equipment 22.

Combining of signals can be accomplished by, for example, analog adders, either at the surface or within the logging tool, or may be combined by digitalizing the signals, and adding the digitalized signals.

From the above it can be concluded that from a combination of different frequencies and different tool-spacings, a signal representing the conductivity of a selected earth layer can be provided, from which signal the influences of the wellbore region and adjacent earth layers are virtually eliminated.

Again, to take into account and to determine the relative orientation of the tool with respect to the formation layering, the procedure is repeated for the coils having magnetic dipole directions in the y-, and z-directions respectively.

Instead of the magnetic dipole moments of each set of coils being located at the same depth (i.e. in z-direction), such magnetic dipole moments can alternatively be located at different depths so as to take account of the size of the individual coils of each set.

We claim:

1. A method of determining an electric conductivity of an earth formation formed of different earth layers, which earth formation is penetrated by a wellbore containing a wellbore fluid, the method comprising the steps of:

lowering an induction logging tool into the wellbore to a location surrounded by a selected one of the earth layers, the tool comprising a magnetic field transmitter effective to induce magnetic fields of different frequencies in the earth formation, and a magnetic field receiver effective to receive response magnetic fields and for providing a signal representative of each response magnetic field, at least one of the transmitter and the receiver having a plurality of magnetic dipole moments in mutually orthogonal directions;

selecting at least two of said different frequencies;

for each selected frequency, operating the transmitter so as to induce a magnetic field in the earth formation and operating the receiver so as to provide a signal representing a response magnetic field, wherein the at least one of the transmitter and receiver is operated in the mutually orthogonal directions;

combining the signals in a manner so as to create a combined signal having a reduced dependency on the electric conductivity in the wellbore region; and determining from the combined signal the formation resistivity and the relative orientation of the logging tool with respect to the formation layering.

2. The method of claim 1 wherein the receiver is effective to receive response magnetic fields at different spacings from the transmitter, at least two of the different spacings being selected, the transmitter and the receiver being operated for different combinations of the selected frequencies and the selected spacings, and the signals are combined in a manner so that combined signal has a reduced dependency on the electric conductivity of an earth layer adjacent the selected earth layer.

3. The method of claim 1 wherein each of the transmitter and the receiver has a plurality of magnetic dipole moments in mutually orthogonal directions, and wherein each of the transmitter and receiver is operated in the mutually orthogonal directions.

4. The method of claim 1 wherein each of the transmitter and the receiver has three magnetic dipole moments in three orthogonal directions, and wherein each of the transmitter and receiver is operated in the three mutually orthogonal directions.

5. The method of claim 2 wherein each signal includes a component which is a linear function of the frequency of the response magnetic field and is substantially dependent on the conductivity in the wellbore region, and a component which is a non-linear function of the frequency of the response magnetic field and is substantially dependent on the conductivity of the adjacent earth layer, and wherein the linear component is eliminated from the combined signal prior to eliminating the non-linear component from the combined signal.

* * * * *